United States Patent [19]

Murphy

[11] Patent Number: 5,266,810
[45] Date of Patent: Nov. 30, 1993

[54] PACKAGE HEIGHT DETECTOR HAVING A FIRST GROUP OF LIGHT SENSORS SELECTIVELY ENABLED BY THE DETECTOR OUTPUTS OF A SECOND GROUP OF LIGHT SENSORS

[75] Inventor: William J. Murphy, South Acworth, N.H.

[73] Assignee: Imtec, Inc., Bellows Falls, Vt.

[21] Appl. No.: 868,294

[22] Filed: Apr. 14, 1992

[51] Int. Cl.$^5$ .................. G01N 21/86; G01V 9/04
[52] U.S. Cl. ........................ 250/560; 250/222.1
[58] Field of Search ............ 250/560, 221, 222.1, 250/223 R; 356/381, 386, 387

[56] References Cited

U.S. PATENT DOCUMENTS

| | | | |
|---|---|---|---|
| 2,299,798 | 10/1942 | Colson et al. | 250/221 X |
| 3,566,135 | 2/1971 | Mouchart | 250/223 R X |
| 3,727,069 | 4/1973 | Crittenden, Jr. et al. | 250/222.1 |
| 4,192,613 | 3/1980 | Hammar | 356/386 |
| 4,266,124 | 5/1981 | Weber et al. | 250/221 |
| 4,590,410 | 5/1986 | Jönsson | 250/221 X |
| 5,130,532 | 7/1992 | Clemens | 250/221 |

Primary Examiner—David C. Nelms
Assistant Examiner—John R. Lee
Attorney, Agent, or Firm—Stephen G. Matzuk

[57] ABSTRACT

A dimensional detector useful for determining the height of a package as it moves along a conveyor, comprising a light source and corresponding light sensors oppositely disposed across the conveyor, wherein the light is interrupted by the package before being received by the light sensors. Rapid determination of the package height is provided by grouping the light sensors into groups of contiguously disposed light sensors and a group of light sensors interspersed between the contiguously disposed light sensor groups. Included within the group having interspersed light sensors is also a group of contiguously disposed light sensors which are located at the lowest end of the dimension to be measured. According to the invention, the group of light detectors comprising the interspersed light detectors and the lowest dimensional disposed contiguous detectors is first read to determine if the package height is within the lowest dimensional disposed contiguous detector. If not, one of the remaining groups of contiguous light detectors is read, according to the signals from the interspersed light detectors. In this manner, the package height is rapidly determined often with only one group reading, but never more than two group readings.

14 Claims, 4 Drawing Sheets

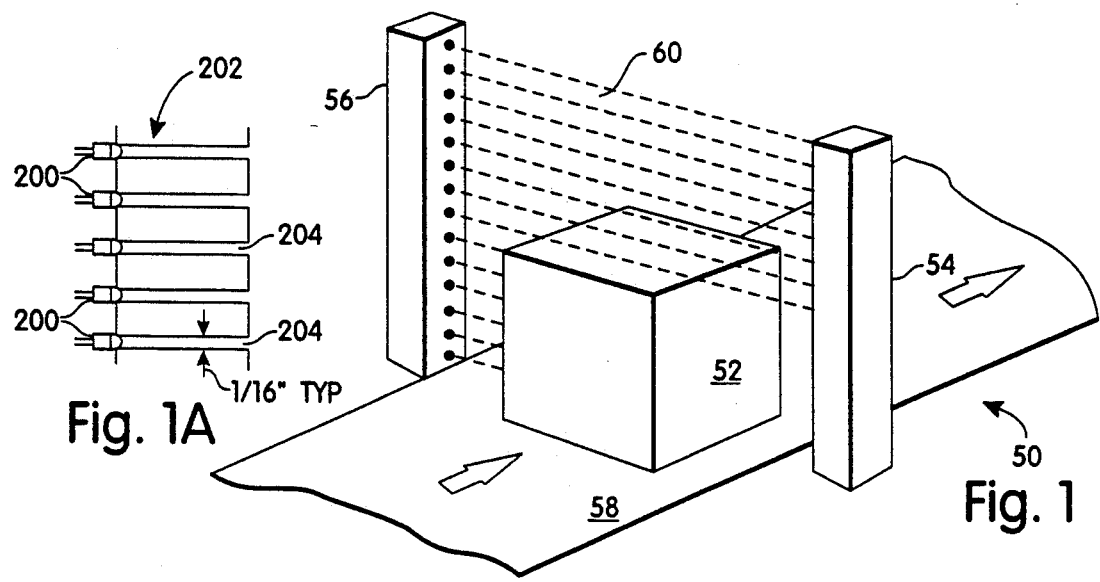
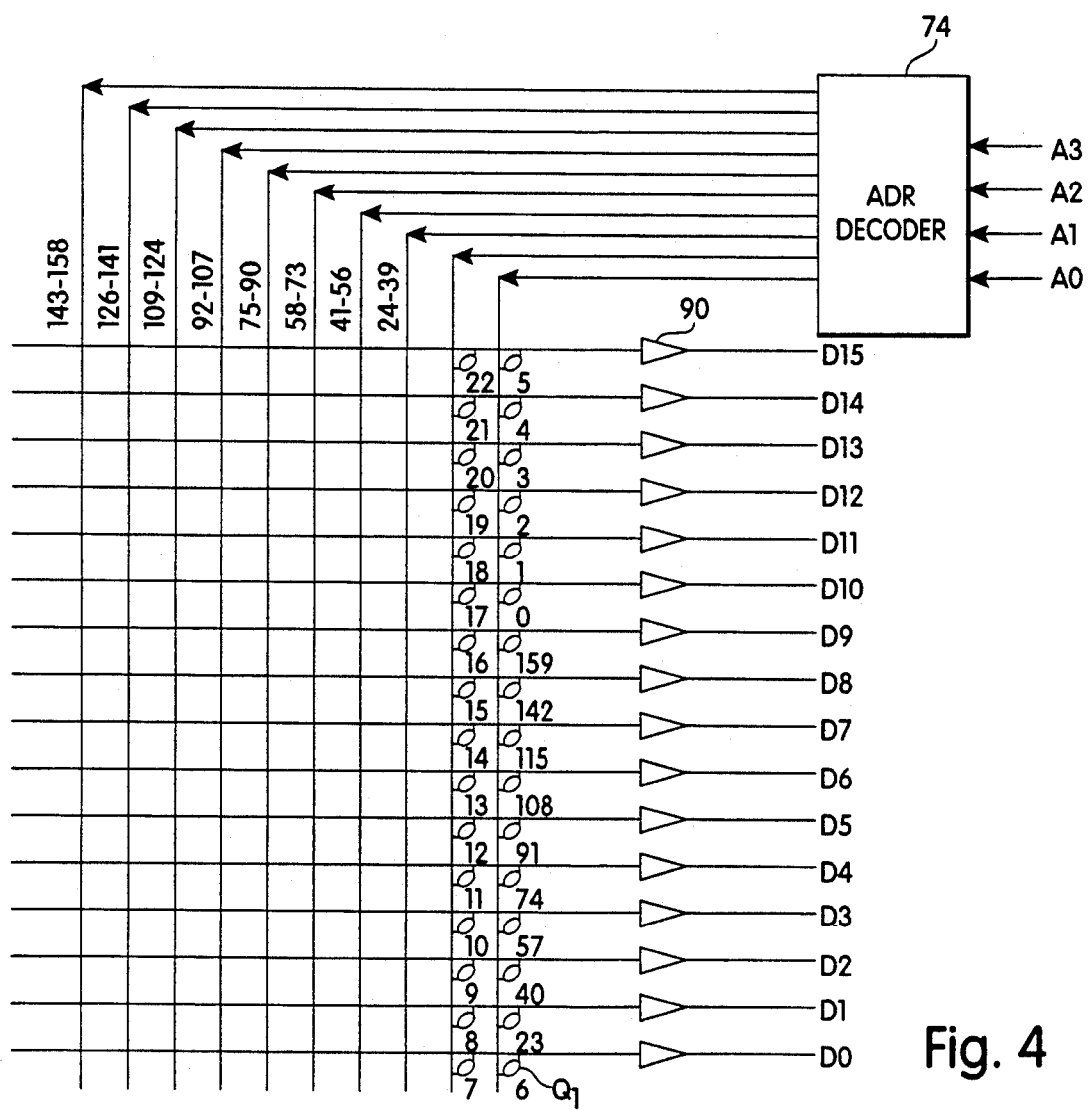

PACKAGE HEIGHT DETECTOR HAVING A FIRST GROUP OF LIGHT SENSORS SELECTIVELY ENABLED BY THE DETECTOR OUTPUTS OF A SECOND GROUP OF LIGHT SENSORS

FIELD OF THE INVENTION

The present invention relates to dimension measuring devices, in particular, to package height detectors for measuring the height of packages on a moving conveyor.

BACKGROUND OF THE INVENTION

Many industries require determination of a dimension of a package which is being transported from one location to another. Preferably, dimensional measurements are best made without interrupting or diminishing the movement of the package to be measured. It is therefore desired to measure the dimension of the packages at the rate they may move, and on the normal path of transit, such as on a conveyor.

A package height detector typically uses a vertically disposed column of closely spaced photocells on one side of the package and a parallel (vertical) light source on the other. The package to be measured interrupts the light (from the light source) impinging on all the photocells in the array that occupy a position corresponding to the bottom and the top of the package.

The bottom of the package is located spatially vertically at a reference plane, for example the horizontally moving surface of a conveyor belt. The column of photocells is located spatially such that its lowermost photocell is aligned approximately at or slightly below the said reference plane.

To simplify circuitry, the photocells are connected in a matrix such that a group of photocells can be interrogated selectively and the light intensity impinging on each cell of the group measured simultaneously. The light intensity is further quantified digitally, such that light intensity falling on a photocell above a certain threshold represents a binary one and light below said threshold represents a binary zero. The threshold level is chosen to be such that it is below the light intensity impinging on the photocells with no package intervening and above the light intensity impinging on the photocells with a package intervening. In this way, a binary one represents the absence of a package intervening between the light source and the photocell and a binary zero represents the presence of such an element. The one and zero definitions are arbitrary, and could readily be oppositely defined.

The sum of all the photocells operating in binary state zero with no package intervening then represents the height of the conveyor reference plane above the bottom of the photocell column. The sum of all the photocells in state zero with a package intervening then represents the height of the reference plane plus the height of the package. The physical height of the package is then determined by subtracting the total sum from the reference sum and multiplying this difference by the physical spacing between photocells, when the spacing between photocells is maintained constant.

In general, the purpose of making an optical measurement of height is to provide dynamic information to a process. The actual package height information is determined from the photocells through processing the photocell information. Quantifying the information into binary form is the first step in the processing.

The next step in processing depends on the grouping of the photocells in groups within the column of photocells. The groups can be arranged in any order, e.g. vertically ascendant. Photocells can grouped in groups of any number and the groups arranged in any order. If, for example, a 16 bit word computer is in use and the photocells are grouped in clusters of 16 photocells per group, then in vertically ascendant order, the first group would comprise photocells numbered 0 to 15, the second group photocells numbered 16–31, etc. Thus, to determine the height of a package, different groups are interrogated in a sequential order, such as vertically ascendant group interrogation, and the information from each cell in the group is analyzed. Therefore, if all the cells of a group contain binary zeroes, it means that the top of the package exists at a level above that of the group from which the data has just obtained, and the next group above will be interrogated in order to find out if the top exists at that level. Processing continues group by group until a group is found wherein an upper element contains binary ones, from which the height of the package can then be calculated. The number of groups that must be interrogated with such a scheme varies greatly and is proportional to the height of the package.

To illustrate, assume a 160 element array equally spaced at 0.2 inches and arranged as 10 groups of 16. If a vertically ascendant order is chosen, then the absence of a package is always determined in one sample. A 3 inch high package will be measured in one sample, a 12 inch high package will take 4 samples and a 24 inch high package will take 8. Assume that a sample can be measured in 400 $\mu$sec. The time to obtain a valid height will thus vary from 400 $\mu$sec to 3.2 msec. If a conveyor is moving at 100 inches per second, this means that the package can move well over ¼ inch just during the processing time to obtain a single data sample. If any processing is done on the sampled data point, for example digital smoothing, the package may have moved significantly before the processed data is even stable.

Alternate interrogation sequences may be used. For example, one might start from the top down. Under this interrogation sequence, no package at all will result in the most processing time and the highest (tallest) package will produce the least processing time. Another scheme might be to start in the middle of the array and proceed up or down based on the results obtained from the prior samples. In any of these schemes, the number of interrogations of the array to arrive at a valid result will always require a number of interrogations that varies with the height of the package. This means that the processing time is a variable, and hence that the sampling rate will vary if high resolution sampling is attempted. The resulting height measurement processing time, being variable, makes processing and integration with other process controls difficult, and if extended in time, will misread package heights or require slower conveyor rates.

SUMMARY OF THE INVENTION

The package height detector according to the present invention measures the heights of moving packages on a moving conveyor belt as they move at the speed of the conveyor belt. A photocell grouping and group interrogation sequence according to the present invention comprises 9 groups in clusters of 16 photocells arranged in vertically ascendant order (within each group) and another group which group has at least some photocells interspersed through the other 9 groups. For example, photocells are numbered by position in vertically ascendant order from 0 to 159, with photocell 0 being at the bottom and 159 at the top of the array. Further, define the groups of photocells as numbered from 0 to 9, and that at least some of the photocells of group 0 are intersperse between other groups. Without limiting the scope of the invention, consider the a group 0 in which the 16 photocells numbered 0, 1, 2, 3, 4, 5, 6, 23, 40, 57, 74, 91, 108, 125, 142, & 159 are clustered. In this arrangement, there is a gap of 16 photocells between sequential cells in group 0 above cell number 6. Each of these gaps is filled by the cells of one of the other groups, each comprising a contiguously numbered sequence of photocells. For example, group 1 includes cells numbered 7-22, group 2 includes cells numbered 24-39 and so forth. The advantage of this grouping will be demonstrated as follows.

Consider a column of photocells configured as discussed above. The processor will initially access group 0. In the absence of a package, the column returns essentially the zero height data since photocells 0-6 return only the height of the reference plane. As a package passes in front of the column, it shadows some portion of the column of photocells proportional to the height of the package. Group 0 returns information to the processor that a package is in view in that some or all of the photocells 0-6 are shadowed by the package. Further, it provides a coarse approximation of the height of the package in that some of the remaining photocells of the group are shadowed whereas others are still illuminated. The processor can now scan the data returned by group zero and find the uppermost photocell shadowed. With this information, the processor knows that the height of the package must be between the uppermost shadowed photocell and the next ascendant illuminated photocell in group 0. By the definition of the grouping in this embodiment, there are in fact 16 photocells between any upper pair of group 0 photocells, and these 16 photocells are configured in a single ascending group. The processor then interrogates the group so identified by the results of the group 0 interrogation. The information returned by the subsequent (second) interrogation of the photocells then contains the interpolated data for the height of the package.

Thus, a processor can determine the presence of any package in the view of the array in a single interrogation, no matter how large or small it might be. Further, it can obtain a coarse approximation of the height in the same single interrogation. Further still, the processor can determine the exact height of the package with only one more interrogation regardless of the height of the package.

BRIEF DESCRIPTION OF THE DRAWING

These and further features of the present invention will be further understood by reading the following Detailed Description of the Invention, taken together with the Drawing, wherein:

FIG. 1 is an isometric mechanical drawing depicting a typical application of the invention disclosed;

FIG. 1A is a partial cross section of the detector array of FIG. 1;

FIG. 4 is a schematic diagram of a preferred embodiment of the invention disclosed;

DETAILED DESCRIPTION OF THE INVENTION

Figure 2:
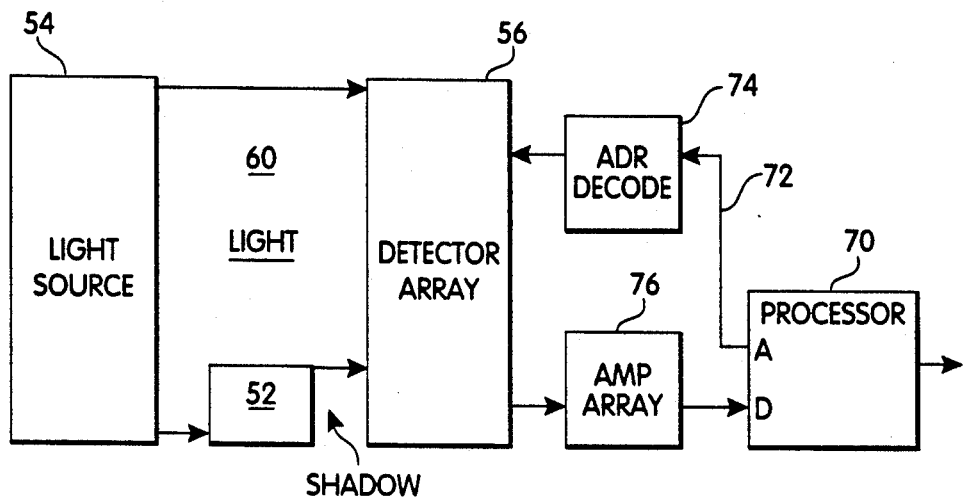
FIG. 2 is an overall block diagram of the invention.

An isometric view 50 of the present invention is shown in FIG. 1, wherein the package 52 to be measured passes between a light source 54 and a detector array 56 on a conveyor 58. The light 60 provided by source 54 is interrupted by the package providing illumination of a selected photocells in the illuminated portion of the detector array 56.

According to one embodiment of the present invention, the detector array 56 includes a plurality of discrete light detectors disposed along the vertical dimension of the detector array generally orthogonally disposed from the plane of the conveyor 52.

As shown in FIG. 1A, individual light detectors 200 are mounted behind a narrow diameter hole 204 in a shadowing block 202. The diameter to length ratio effectively limits the aperture angle of the detector thus providing the detector with considerable depth of field. This collimator eliminates any requirement for the light source to be spatially coherent or planar, and hence any light source of suitable intensity and wavelength may be used. In the instant embodiment, ordinary household flood lights operating at under (e.g. one half) rated power are quite satisfactory.

The plurality of light detectors are divided into addressable (selectable) groups, the majority of which groups contain contiguously disposed light detectors, typically phototransistors. Address lines 72 from the processor 70 of FIG. 2 select a group address with an address decoder 74. The group address may be any one of G0-G9. Selection of a group address enables all of the group phototransistors (whose emitters are connected to the selected decoded address signals) to become electrically responsive to light impinging upon them. All other phototransistors not so selected are electrically inactive, regardless of the light impinging on them. The arrangement is such that selecting a single address comprises a matrix which selects only one group of 16 phototransistors, the each collector of which is connected to a specific amplifier within the array amplifier 76, and providing a corresponding binary signal to the processor 70.

Figure 5:
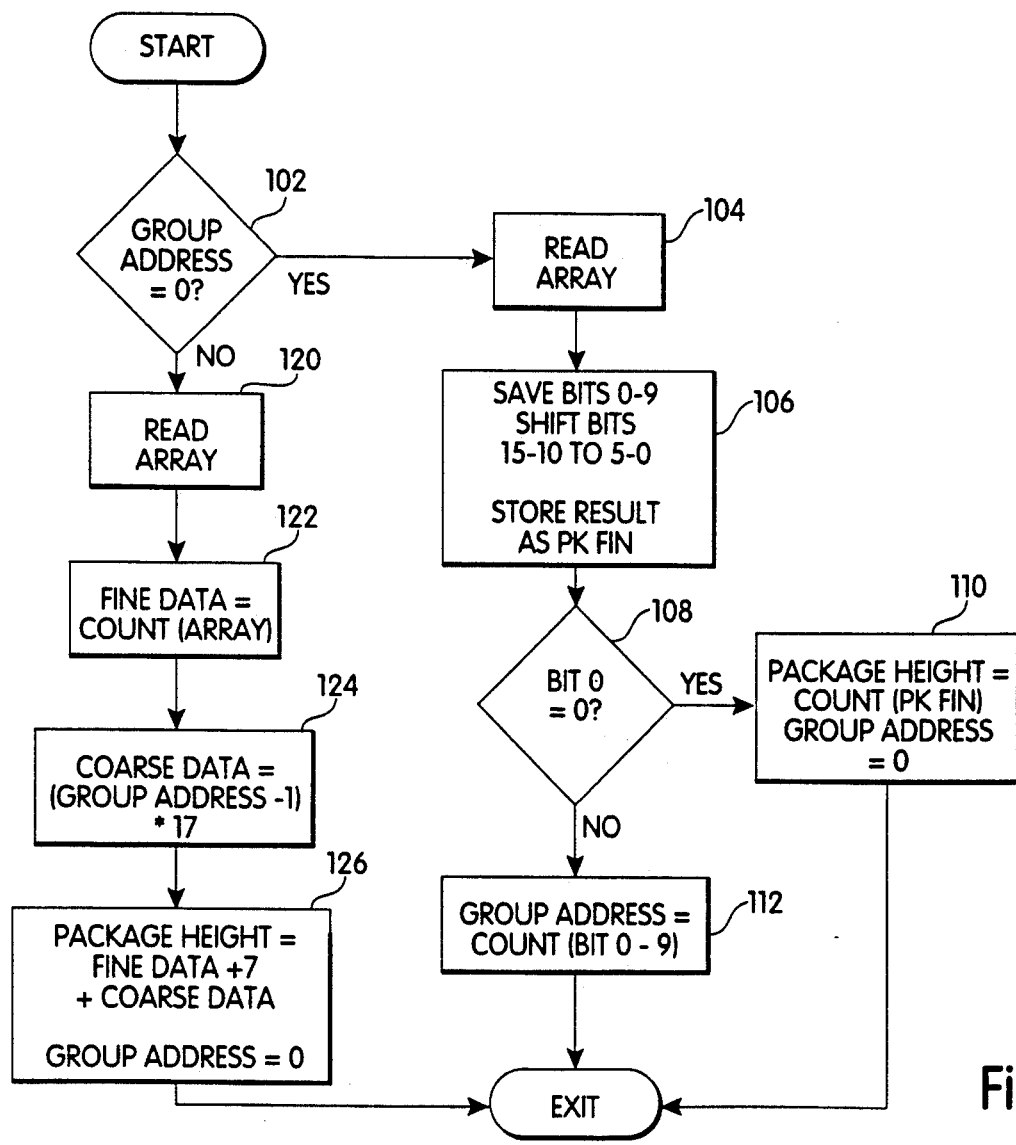
FIG. 5 is a flow chart showing the processing of the data from the invention disclosed to yield the height of a package.
Figure 3:
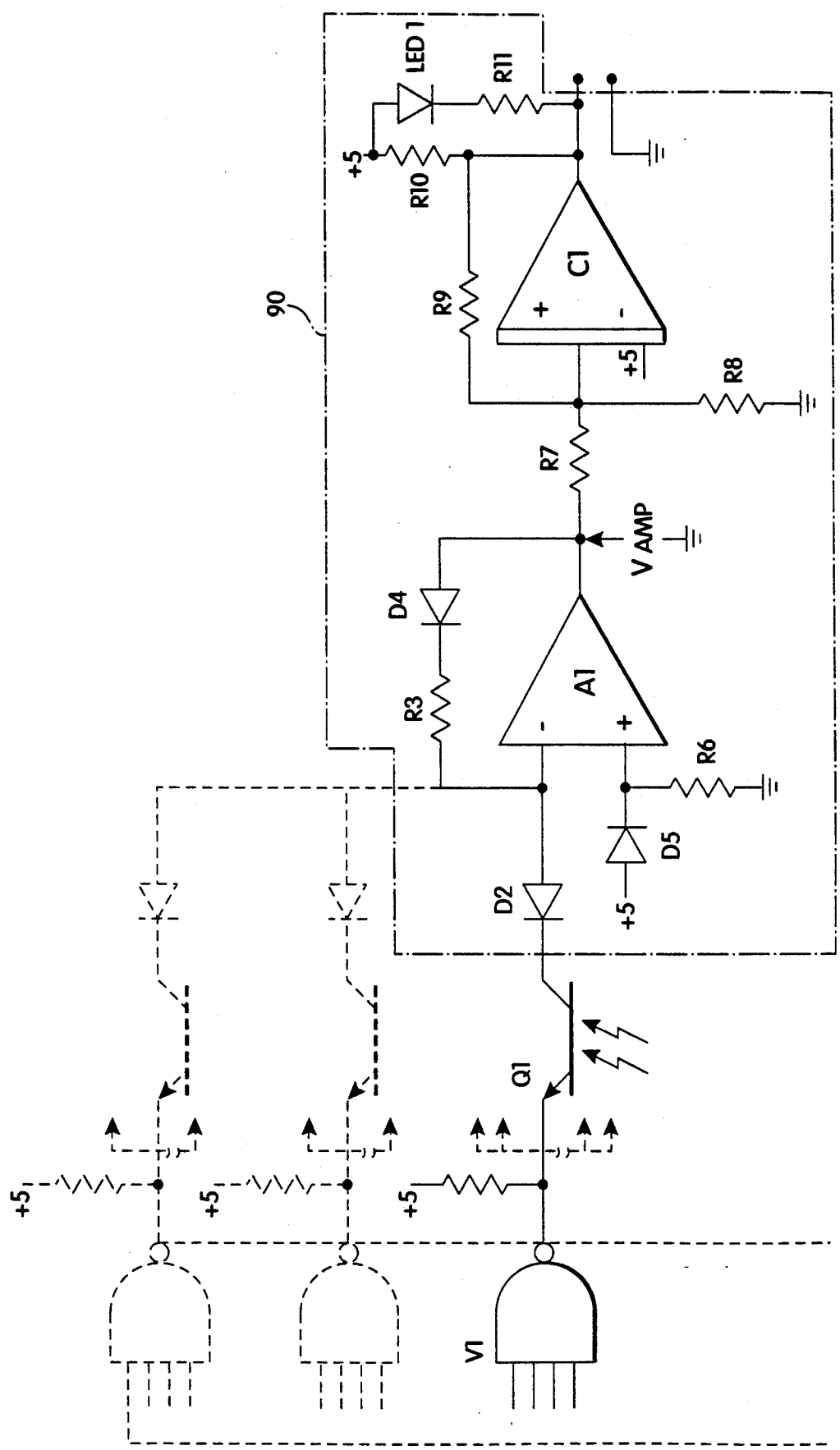
FIG. 3 is a simplified schematic of a single cell and amplifier.

FIG. 3 shows a typical photocell and photocell amplifier 90 arrangement. The address decoder (74) gate U1 and phototransistor Q1 selected (by the processor as illustrated in FIG. 4 and 5), are shown solid in the figure. Some of the other non-selected decoder gates and phototransistors are shown in phantom. The output device of the selected decoder gate U1 connects the emitter of the selected phototransistor Q1 to ground, thereby applying a bias to the collector-emitter junction and causing the transistor Q1 to conduct a current that is a function of the light impinging upon it. An operational amplifier A1 adjusts its output voltage Vamp to a value just sufficient to maintain the collector current of the phototransistor Q1 through the path D4, R3, D2, and Q1. The operational amplifier A1 output voltage Vamp is thus a function of the collector current in Q1 which in turn is a function of the light impinging upon the phototransistor Q1. Moreover, the inclusion of diode D4 makes this function a logarithmic response to the light intensity sensed by the phototransistor Q1. The diode D5 and the resistor R6 establish a reference voltage for the amplifier A1 and also provide compensation of the reference voltage for variations in temperature. This arrangement eliminates the need for individual sensitivity adjustments of the amplifiers or the individual phototransistors. The diode D2 serves to isolate the amplifier A1 from leakage current in the phototransistor Q1 when Q1 is deselected.

The output voltage Vamp from the operational amplifier A1 is compared to a reference voltage (+5 v in the figure) by the comparator C1, and when it exceeds that value, the comparator C1 output switches to a logical one (+5 v). If the light intensity impinging on the phototransistor Q1 causes Vamp to be below the threshold, the comparator output will be a logic zero (zero volts). The sixteen comparator output signals are received by the processor (70), and therein logically inverted. The light emitting diode LED1 is thus on whenever the light impinging on a phototransistor that is connected to the corresponding amplifier, is shadowed. The light emitting diodes are useful as indicators in calibrating the detector array light sensitivity by adjusting the light source 54.

Shown in FIG. 4 is a 10×16 array of phototransistors numbered 0 through 159 and connected in a matrix such that the emitter of each of 16 phototransistors is connected to a specific decoded group address line coming from the address decoder logic 74 and the collector of each of 16 separately enabled phototransistors is connected to the input of a specific amplifier, 90. There are 16 amplifiers 90, each of which is assigned to a specific digital data bit position designated D0-D15 in the figure.

In this manner, selection of a group address results in 16 specific phototransistors connected to 16 amplifiers, the output of each amplifier then being a digital value indicating whether the light intensity impinging on the specific phototransistor thus selected is above or below a threshold value.

A flow chart depicting the processing of the information from an array is shown in FIG. 5. In the processor (70), it is first determined 102 if the group address selected on the prior processing interval is 0 or another group. If group 0 is selected, data in bits 0-9 is read 104 and saved 106 in one place as the "coarse" data and that in bits 10-15 as the "fine" data. It is then determined if bit 0 (which corresponds to cell position 6) is a zero, 108. If so, the package height is given by the fine data only, 110. The processor then counts the number of bit positions in the fine data that correspond to the package shadow (dark) and sets the package height equal to this count. The group address remains at zero for the next processing interval.

If group 0 bit 0 (cell position 6) is a one (108) corresponding to a dark or shadowed phototransistor, then the package height is above the level of bit 0 (cell 6). The processor then counts the number of bits in the coarse data (bits 0-9) that are dark (logic 1) at 112, and outputs this value as the group address for the next processing interval, except that if bits 0-9 are all ones, the package height exceeds the detector range, there being no group address 10 in the present example (although alternate embodiments can include the address in a varied addressing scheme).

If the group address from the prior processing interval is not 0 (102), the array is read 120 and the processor interprets all of the data as fine data and counts the number of bits in the data that are dark, at 122. The coarse address minus 1 is multiplied by 17 (spacing between coarse values) to which the fine data count is added at 124, following which the constant 7 (offset of group address 0 fine count) is added to arrive at the interpolated package height, at 126. The group address is then set to 0 for the next processing interval.

Alternately, group 0 may be positioned at the expected dimension, such as if the packages were aligned or sized to provide an expected package height, and the other group detectors positioned at less frequently measured dimensions.

Figure 6:
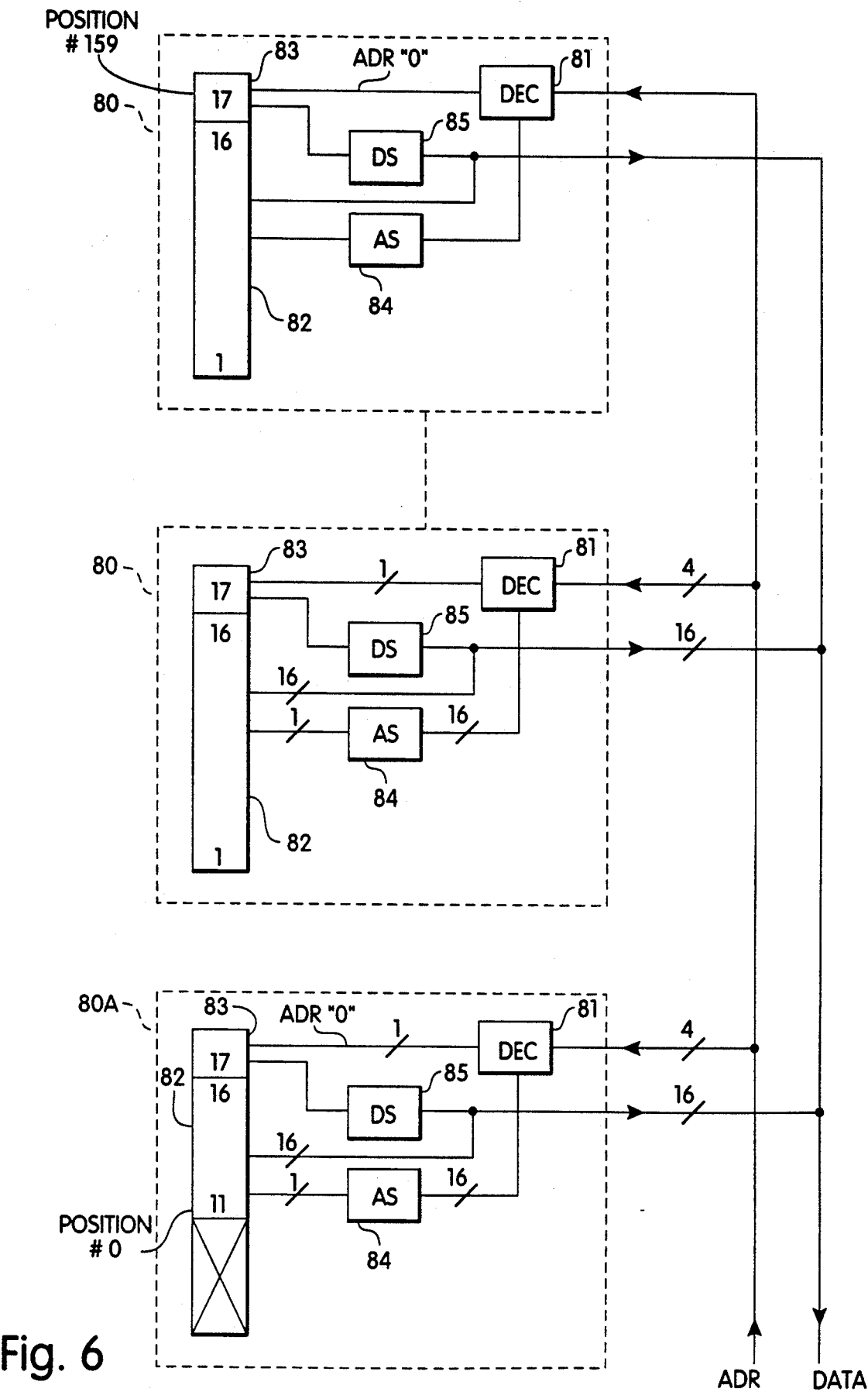
FIG. 6 is a block diagram of one embodiment of the present invention.

A further refinement in the present embodiment shown in FIG. 6 is implemented with a plurality of substantially identical detector array cards 80, 80A, each receiving all decoded address signals from address decoder 81, each making connection to the data leads (prior to the amplifiers 90) and each having a group 82 of 16 phototransistors responsive to a single address (1-9) as selected by a first (address) selector 84 on each card, and each having a 17th phototransistor 83 responsive to a separate address (0) and providing its (17th) signal to a unique data path (no two 17th phototransistor on the same data path) selected by a second (data path) selector 85 on each card. In this case, card 0 phototransistor positions 0-9 are depopulated, leaving only positions 10-15 for fine height detection in card 0 (plus position 16).

The above-described embodiment is solely exemplary and does not limit the scope of the present invention. For instance, the methods and apparatus according to the present invention are applicable to the measurement of objects generally, without limitation to packages. Modifications and substitutions made by those skilled in the art are considered to be within the scope of the present invention. The scope of the present invention is limited solely by the claims which follow.

What is claimed is:

1. Apparatus for detecting the dimension of an object, comprising:
 a light source for providing illumination along said dimension;
 a detector array comprising a plurality of light sensors disposed along said dimension providing corresponding detector output signals, and being selectably enabled according to an address signal, and comprising a plurality of first groups of light sensors arranged to correspond to contiguous locations along said dimension and a second group of light sensors including a plurality of sensors interspersed between the sensors of said first group, wherein said object is selectively positioned to selectively obscure at least a portion of said light from said light sensors; and
 means for determining the dimension of said object, providing a signal corresponding to said dimension, and including -
  means for enabling said second group of light sensors, and
  means for selectively enabling the first group of light sensors in response to the second group detector output signals.

2. The apparatus of claim 1, wherein said dimension comprises the vertical dimension.

3. The apparatus of claim 2, wherein said signal corresponding to said dimension corresponds to the height of said object.

4. The apparatus of claim I, wherein said dimension comprises a horizontal dimension.

5. The apparatus of claim 4, wherein said signal corresponding to said dimension corresponds to one of the width and the length of said object.

6. The apparatus of claim 1, wherein the plurality of photo sensors is linearly disposed along said dimension.

7. The apparatus of claim 1, wherein said first group comprises 16 light sensors, and said second group includes 8 light sensors individually disposed between 9 of said first groups.

8. The apparatus of claim 7, wherein said second group includes 7 light sensors contiguously disposed at one extreme of said dimension.

9. The apparatus of claim 7, wherein said second group includes 8 light sensors contiguously disposed at the expected dimension of said object.

10. The apparatus of claim 1, wherein said second group includes 14 light sensors individually disposed between 15 of said first groups.

11. Apparatus for detecting the dimension of an object, comprising:
    means for providing radiant illumination along said dimension;
    a detector array comprising a plurality of radiant illumination sensors disposed along said dimension providing corresponding detector output signals, and being selectably enabled according to an address signal, and comprising a plurality of first groups of radiant illumination sensors arranged to correspond to contiguous locations along said dimension and a second group of radiant illumination sensors including a plurality of sensors interspersed between the sensors of said first group, wherein said object is selectively positioned to selectively obscure at least a portion of said radiant illumination from said radiant illumination sensors; and
    means for determining the dimension of said object according to said detector output signals, providing a signal corresponding to said dimension, and including
        means for enabling said second group of light sensors, and
        means for selectively enabling the first group of light sensors in response to the second group detector output signals.

12. The apparatus of claim 11 wherein said second group includes a light sensor disposed at each extreme end of said detector array.

13. The apparatus of claim 11, wherein said detector array includes a collimator.

14. A method of measuring a dimension of an object, comprising the steps of:
    obscuring a field of radiant energy by said object along at least one dimension thereof;
    detecting the radiant energy along said dimension by discrete sensors disposed along said dimension, wherein said sensors comprise a plurality of first group of contiguously grouped sensors and a second group of sensors including sensors interspersed between said first groups and a plurality of contiguously grouped sensors;
    receiving signals from said second group;
    selectively receiving signals from said first group according to said signals received by said second group; and
    determining said dimension according to said signals from said second group and said selectively received signals from said first group.

* * * * *